United States Patent [19]

Ramesh et al.

[11] Patent Number: 5,314,627
[45] Date of Patent: May 24, 1994

[54] HYDROPHOBIC POLYELECTROLYTES USED IN COLOR REMOVAL

[75] Inventors: Manian Ramesh, Naperville; Chandrashekar S. Shetty, Lisle; Martha R. Finck, Countryside, all of Ill.

[73] Assignee: Nalco Chemical Company, Naperville, Ill.

[21] Appl. No.: 119,943

[22] Filed: Sep. 13, 1993

Related U.S. Application Data

[62] Division of Ser. No. 913,244, Jul. 14, 1992, Pat. No. 5,292,793.

[51] Int. Cl.$^5$ .................................................. C02F 1/56
[52] U.S. Cl. ..................................... 210/734; 162/189; 210/917; 210/928
[58] Field of Search ................ 162/189; 210/705, 725, 210/727, 728, 734, 917, 928

[56] References Cited

U.S. PATENT DOCUMENTS

| | | | |
|---|---|---|---|
| 4,425,238 | 1/1984 | Degen et al. | 210/917 |
| 4,835,234 | 5/1989 | Valint et al. | 210/734 |
| 4,851,128 | 7/1989 | Rose | 210/917 |
| 5,068,297 | 11/1991 | Bhattacharyya et al. | 526/287 |
| 5,200,089 | 4/1993 | Siefert et al. | 210/917 |

FOREIGN PATENT DOCUMENTS

| | | | |
|---|---|---|---|
| 60229959 | 4/1984 | Japan. | |
| WO89/02417 | 3/1989 | PCT Int'l Appl. | 210/928 |

OTHER PUBLICATIONS

Hamid and Sherrington, "Polymerized Micelles: Fact or Fancy?", J. Chem Soc., Chem. Commun. 1986 (pp. 936–938).

*Primary Examiner*—Peter A. Hruskoci
*Attorney, Agent, or Firm*—Ohlandt, Greeley & Ruggiero

[57] ABSTRACT

A hydrophobic polyelectrolyte copolymer which is useful in the removal of color in paper mill waste water. The copolymer preferably comprises an acrylamide and a hydrophobic monomer selected from the group consisting of quaternized dimethylaminoethylacrylates and quaternized dimethylaminoethylmethacrylates.

6 Claims, 2 Drawing Sheets

HYDROPHOBIC POLYELECTROLYTES USED IN COLOR REMOVAL

This is a division, of application Ser. No. 07/913,244, filed Jul. 14, 1992, now U.S. Pat. No. 5,292,793.

The present invention relates generally to polyelectrolyte compositions useful in the removal of color from pulp and paper waste waters. These polyelectrolyte compositions are preferably hydrophobically modified copolymers of acrylamide (AcAm) and either dimethylaminoethylacrylate (DMAEA) or dimethylaminoethylmethacrylate (DMAEM).

BACKGROUND OF THE INVENTION

Color removal from the effluent streams of paper mills continues to be a problem within the pulp and paper industry. It is necessary that these downstream waste waters be treated for color removal prior to discharge into public waterways.

The United States wood pulp production capacity is approximately 60 million tons per year. Since the average cellulose content of wood is about 40%, 150 million tons of wood are needed to produce this 60 tons of pulp. The difference between these two numbers represents the lignin and hemicellulose which must be removed or separated in the pulping process in order to free the cellulose fibers.

The pulping process, however, does not remove 100% of the lignin present in the wood, with approximately 5% remaining after either kraft or sulfite pulping (for mechanical pulping the amount is considerably higher). If a high grade paper is the desired end product, this 5% residual lignin must be removed, and is accomplished by bleaching the pulp.

Since over 35% of the pulp produced in the United States is bleached, there are about one million tons of lignin removed each year at the bleach plant, and most of this in the caustic extraction stage. This number is significant because in the removal process (i.e., bleaching), most of this residual lignin is solubilized. This solubilized lignin is a strong absorber of visible radiation resulting from the conjugation of unsaturated and quinoidal moieties formed during the oxidation step in the bleach plant. Consequently, the bleach plant effluent is highly colored. Although there are other sources of color in paper mill waste effluent, it is readily apparent that where bleaching is performed its effluent can be expected to be the major contributor of waste color. Indeed, at kraft, bleach mills the effluent from the first caustic extraction stage accounts for at least 70% of the waste color.

The goal of the pulping and bleaching operations is the removal of lignin and hemicellulose from the cellulose fiber in the wood. The 95% that is removed by pulping is often burned as fuel in the process of recovering the inorganic chemicals present in the black liquor. In the bleaching operation, the 5% residual lignin is separated from the fibers by degradation and solubilization and ends up in the waste water. Chemical removal can, therefore, only be accomplished by reducing this solubility, which has proved to be a difficult task.

Therefore, the primary source of color in pulp is lignin. It has also been suggested that kraft color is due to ketoenols produced from carbohydrates during the kraft cook stage in the papermaking process. Chlorination of the pulp during the bleaching operation results in the formation of color bodies which are leached from the pulp by caustic alkali solutions. Thus, the caustic extract effluent contains a major proportion of the color bodies and the other organic materials which have to be disposed during the waste water treatment.

The process of color removal from the effluent stream is further complicated by the presence of lime, solid particulate matter like pulp, clay, dispersants/surface active materials and polymers used during various stages in the papermaking process. The solid particulate matter is commonly referred to as anionic trash.

Most governmental regulations pertaining to color removal from the effluent stream of a papermaking process are directed to true color, i.e., the color at pH of 7.6 after filtration through a 0.8 micrometer filter paper and expressed as Pt Co Color units (i.e., platinum cobalt color using a DR2000 spectrophotometer). Nevertheless, there is increasing pressure on pulp and paper mills to lower the apparent color of the effluent water because that is the color visible to the naked eye as the effluent flows into public waterways. There are occasions when the true color of a system that has undergone treatment is low, but the corresponding apparent color is high. This problem is commonly caused by the presence of suspended particulate matter that causes an increase in the turbidity of the system. Therefore, it is important that any new treatment for color removal should not only remove the true color of the effluent, but should also lower the apparent color as well.

The pressure to remove color comes primarily from state environmental agencies. Previously, it was thought that the discharge of colored waste affected only the aesthetic value of the receiving body of water; however, biologists are becoming increasingly concerned about possible toxic effects, the effect of reduced light transmittance through the water causing reduced levels of photosynthetic activity, and of course, the resultant drop in dissolved oxygen concentration because of this drop in activity. Furthermore, although these colored, waste products are fairly refractory towards biological oxidation and since they become degraded in the aquatic environment, the oxidation products may be potentially harmful.

It has been shown that by-products are water soluble, and that a significant amount is produced. This puts severe demands on chemicals to be used for color removal. There are techniques already available, however, that can remove greater than 90% of the color from either total mill effluent or isolated waste streams, such as from the caustic extraction stage of the bleach plant. These techniques include chemical (e.g., alum, ferric, lime or polyelectrolytes), biological (e.g., white rot fungus) and physical processes (e.g., ultrafiltration, ion exchange and carbon absorption). None enjoys widespread use because of unfavorable economics.

The demands on a product used in a color removal application are quite severe, i.e., the product must be capable of reacting with the color bodies in a manner which results in their becoming insoluble and, because of the extremely large amount produced, the color removal product must work at very low weight ratios relative to the organic being removed or its use will be precluded by prohibitive costs.

A common problem associated with conventional chemical treatment methods, such as epichlorohydrin/dimethylamine (Epi/DMA), is the fact that those polymers cannot lower the color of a system below a certain value beyond which they tend to redisperse the color. This problem is commonly referred to as "overdosage."

The present inventors have discovered through extensive experimentation that hydrophobically modified copolymers are excellent agents for the removal of both "apparent" and "true" color in pulp and paper mill waste water. The color removal characteristics of acrylamide (AcAm) is significantly improved by imparting a certain degree of hydrophobicity. Modification is accomplished by copolymerizing AcAm with a selected hydrophobic monomer to form a hydrophobic polyelectrolyte. These hydrophobic polyelectrolytes display excellent replacement ratios, while avoiding the problem of "overdosage" which frequently arises when conventional polymers are used to remove color. These polyelectrolytes have a unique mode of action which could lead to an all organic treatment for removal of color in pulp and paper mill waste water.

The present invention also provides many additional advantages which shall become apparent as described below.

SUMMARY OF THE INVENTION

Hydrophobic polyelectrolyte copolymers are useful in the removal of color from pulp and paper mill waste waters. These hydrophobic polyelectrolyte copolymers comprise acrylamide (AcAm) and a hydrophobic monomer. The hydrophobic monomer is preferably selected from an appropriately quaternized dimethylaminoethylacrylate (DRAEA) or dimethylaminoethylmethacrylate (DMAEM). The quaternized DMAEA and DMAEM monomers may include $C_8$ to $C_{20}$ chloride or bromide quaternaries, e.g., cetyl chloride quaternary (CCQ) or cetyl bromide quaternary (CBQ).

These hydrophobic polyelectrolyte copolymers are preferably made by a batch mode technique which includes the following steps: (a) charging acrylamide into a polymerization reaction vessel in an amount between about 1.3 to about 5.8 weight percent; (b) charging a hydrophobic monomer into the polymerization reaction vessel in an amount between about 4.1 to about 8.6 weight percent; (c) charging a polymer initiator into the polymerization reaction vessel in an amount between about 0.005 to about 0.03 weight percent; and (d) heating the mixture of acrylamide, polymer initiator and hydrophobic monomer to a temperature in the range between about 65° C. to about 70° C.

It is the primary object of the present invention to remove color from a paper mill waste effluent by adding a hydrophobic polyelectrolyte copolymer thereto.

Other and further objects, advantages and features of the present invention will be understood by reference to the following specification.

DESCRIPTION OF THE PREFERRED EMBODIMENTS

Figure 1:
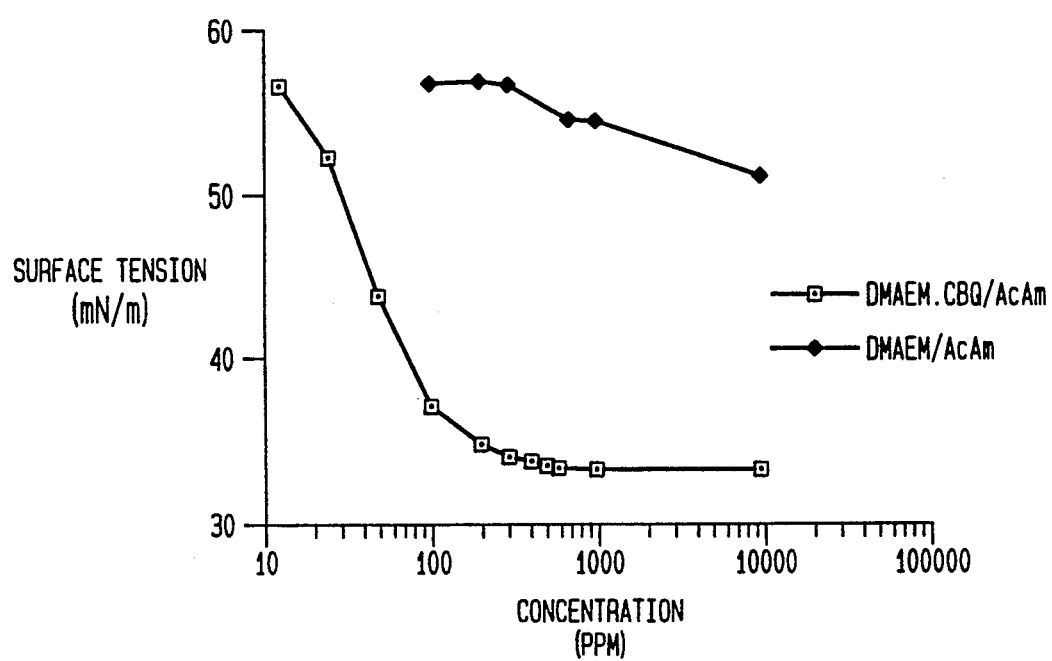
FIG. 1 is a graph plotting concentration versus surface tension for the hydrophobic polyelectrolyte dimethylaminoethylmethacrylate cetyl bromide quaternary (DMAEM.CBQ)/acrylamide (AcAm) and the polyelectrolyte dimethylaminoethylmethacrylate (DMAEM)/acrylamide (AcAm)

The hydrophobic polyelectrolyte copolymers described herein are particularly useful in color removal, coal coagulation, pitch control and residual oil removal applications. The copolymers according to the present invention have been shown to be efficient agents for the removal of color caused by lignins and their derivatives present in the paper mill waste water effluent. It has been discovered that the performance of acrylamide (AcAm) can be significantly improved by incorporating a certain degree of hydrophobic nature. Such a modification can be accomplished by copolymerizing AcAm with hydrophobic monomers, such as quaternized dimethylaminoethylacrylate (DMAEA) or dimethylaminoethylmethacrylate (DMAEM).

The quaternized DMAEA is selected from the group consisting of: dimethylaminoethylacrylate having $C_8$ to $C_{20}$ chloride or bromide quaternaries. It is preferable that the quaternized dimethylaminoethylacrylate be either dimethylaminoethylacrylate cetyl chloride quaternary or dimethylaminoethylacrylate cetyl bromide quaternary.

Similarly, the quaternized DMAEM is selected from the group consisting of: dimethylaminoethylmethacrylate having $C_8$ to $C_{20}$ chloride or bromide quaternaries. Preferred quaternaries are dimethylaminoethylmethacrylate cetyl chloride quaternary and dimethylaminoethylmethacrylate cetyl bromide quaternary.

The hydrophobic monomer is the reaction product of either DMAEA or DMAEM and a long chain halide which produces a quaternized amine. The long chain halide is preferably selected from the group consisting of: octylbromide, bromoeiconsane, decyl bromide, and cetyl bromide. That is, the long chain amine is incorporated onto the backbone of either DMAEA or DMAEM.

The resultant hydrophobic polyelectrolytes are surface active due to the micellar character of the pendant long chains and the positive charge near the polymer backbone. The examples below demonstrated that these hydrophobic polyelectrolytes exhibit good color removal without overdosage.

The hydrophobic polyelectrolyte copolymer typically has an acrylamide to hydrophobic monomer molar ratio in the range from 50:50 to 90:10.

A preferred process for making the hydrophobic polyelectrolyte copolymers according to the present invention comprise the following steps:

a. charging acrylamide into a polymerization reaction vessel in an amount between about 1.3 to about 5.8 weight percent;

b. charging a hydrophobic monomer into the polymerization reaction vessel in an amount between about 4.1 to about 8.6 weight percent;

c. charging a polymer initiator into the polymerization reaction vessel in an amount between about 0.005 to about 0.03 weight percent; and d. heating the mixture of acrylamide, polymer initiator and hydrophobic monomer to a temperature in the range between about 65° C. to about 70° C.

Deionized water is added periodically as needed during the polymerization process in a total amount between about 86 to about 95 weight percent. For example, both the acrylamide and the hydrophobic monomer are initially dissolved in deionized water prior to being charged into the polymerization reaction vessel.

This process produces a hydrophobic polyelectrolyte copolymer with a PH in the range from about 4.0 to 4.5.

The acrylamide, polymer initiator and hydrophobic monomer are heated at a temperature in the range between about 65° C. to about 67° C. for a period of about 4 to 5 hours. Thereafter, the temperature of the reaction vessel is increased to about 70° C. to about 75° C. for a period of between about 1 to 2 hours. After polymerization has been completed the copolymer product is typically diluted with deionized water, cooled and stored.

The polymer initiator is selected from the group consisting of Vazo(50) (i.e., 2,2'-azobis(2-amidopropane)hydrochloride) and ammonium persulfate. Other possible initiators are redox initiators (e.g., ammonium persulfate/sodium bisulfite).

FIG. 1 clearly demonstrates that the surface tension of the DMAEM.CBQ/AcAm hydrophobic polyelectrolyte copolymer is much less at higher concentrations than that of DMAEM/AcAm copolymers. This behavior enables the DMAEM.CBQ/AcAm copolymer to remove a substantial percentage of colors from a pulp and paper mill effluent at increasing concentrations.

Figure 2:
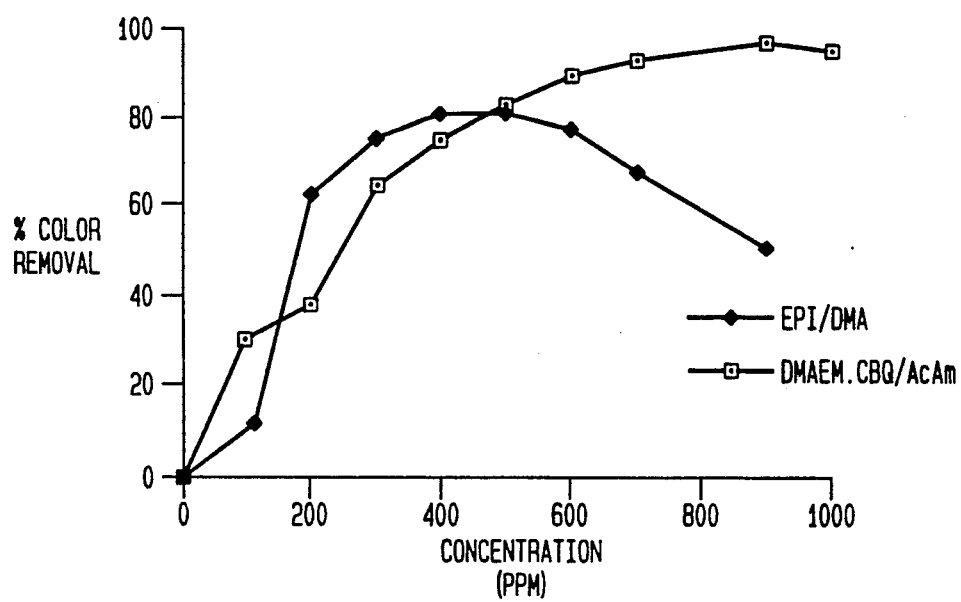
FIG. 2 is a graph plotting concentration versus percent color removal for epichlorohydrin/dimethylamine (Epi/DMA) and the hydrophobic polyelectrolyte dimethylaminoethylmethacrylate cetyl bromide quaternary (DMAEM.CBQ)/acrylamide (AcAm).

FIG. 2 demonstrates that DMAEM.CBQ/AcAm hydrophobic polyelectrolyte copolymers exhibit substantially greater color removal properties at higher concentrations without experiencing "overdosage." The conventional color removal polymer of epichlorohydrin/dimethylamine (Epi/DMA) exhibits a decline in the rate of color removal at concentrations of 400 ppm and greater. This reduction in color removal at greater concentrations is caused by the phenomenon referred to as "overdosage." To the contrary, the hydrophobic polyelectrolyte copolymer of DMAEM.CBQ/AcAm exhibits increased color removal from 400 ppm to 1,000 ppm.

The present invention can best be understood by reference to the following working and comparative examples.

EXAMPLE

A hydrophobic polyelectrolyte copolymer was formed from 45% acrylamide (AcAm) and 55% dimethylaminoethylmethacrylate cetyl bromide quaternary (DMAEM.CBQ) monomers. The preparation of DMAEM.CBQ was effected as follows:

| | |
|---|---|
| 80.00 grams | 97% Solution of Cetyl Bromide |
| 40.00 grams | 99% DMAEM |
| 0.08 grams | Hydroquinnone |
| 500.00 grams | Ethanol |

The above reactants were combined and heated at reflux for 4 hours. The solvent (ethanol) was removed under reduced pressure. A gummy liquid upon cooling afforded pale pink colored solid DMAEM.CBQ monomer in 96% yield. This monomer was then dissolved in deionized water to a desired dilution.

A preparation of dimethylaminoethylmethacrylate cetyl chloride quaternary (DMAEM.CCQ) was effected by stirring an aqueous solution (25% actives) of the DMAEM.CBQ (1000 grams), prepared as above, with Amberlite IRA-400 (Cl−) ion-exchange resin for 30 minutes. The resin was filtered and the monomer used in subsequent polymerizations.

The DMAEM.CBQ monomer prepared above was the added to the following reagents to synthesize a hydrophobic polyelectrolyte product:

| | |
|---|---|
| 18.82 grams | 48% Solution of AcAm |
| 250.00 grams | 23.5% Solution of DMAEM.CBQ |
| 1.79 grams | 2% Solution of Versene |
| 1.79 grams | 10% Solution of Ammonium Persulfate |
| 227.60 grams | Deionized Water |

To a polymerization reaction vessel containing DNAEM.CBQ was added AcAm and deionized water followed by versene. The reaction mixture was heated to 65° C., under a stream of nitrogen. After 2 hours the temperature was increased to 70° C. for one hour.

EXAMPLE 2

A hydrophobic polyelectrolyte copolymer was formed from 78.73 % acrylamide (AcAm) and 21.27% dimethylaminoethylmethacrylate cetyl bromide quaternary (DMAEM.CBQ) monomers. The following reagents were used to prepare the DMAEM.CBQ monomer:

| | |
|---|---|
| 40.00 grams | 97% Solution of Cetyl Bromide |
| 20.18 grams | 99% DMAEM |
| 0.04 grams | Phenothiazine (500 ppm) |
| 138.00 grams | Deionized Water |
| 0.10 grams | Potassium Iodide (KI) |
| 200.00 grams | THF |

DMAEM was added to water and phenothiazine in a reaction vessel. This mixture was heated at 65° C. for 3.5 hours. Thereafter, the solvent was removed and the residue obtained was diluted with deionized water to a 23.5% active solution.

The DMAEM.CBQ monomer prepared above was added to the following reagents to synthesize a hydrophobic polyelectrolyte product:

| | |
|---|---|
| 18.82 grams | 48% Solution of AcAm |
| 13.50 grams | 23.5% Solution of DMAEM.CBQ |
| 1.79 grams | 2% Solution of Versene |
| 2.29 grams | 10% Solution of Ammonium Persulfate |
| 475.00 grams | Deionized Water |

To a polymerization reaction vessel containing DMAEM.CBQ was added AcAm and deionized water followed by versene. The reaction mixture was heated to 65° C., under a stream of nitrogen. After 2 hours the temperature was increased to 70° C. for one hour.

EXAMPLE 3

A hydrophobic polyelectrolyte copolymer was formed from acrylamide (AcAm) and dimethylaminoethylmethacrylate cetyl chloride quaternary (DMAEM.CCQ) monomers. The following reagents, except for the initiators, were charged into a polymerization reaction vessel:

| | |
|---|---|
| 16.00 grams | 49% Solution of AcAm |
| 53.00 grams | 14% Solution of DMAEM.CCQ |
| 1.00 grams | Adipic Acid |
| 0.10 grams | 2% Solution of Versene |
| 0.13 grams | 10% Solution of Ammonium Persulfate |
| 0.25 grams | Sodium Meta Bisulfite (SMBS) |
| 136.90 grams | Deionized Water |

The initiators were charged into separate syringes. The initiators were then added to the reaction vessel and heated at 40° C. over 4 hours. This redox polymerization became viscous after several hours at 40° C. and slow addition of ammonium persulfate (APS) and SMBS. After 4.5 hours, more SMBS was added, i.e., 80 mg dissolved in 5 ml of water. A 1° C. exotherm followed this addition. stirring continued for another hour. The reaction mixture was allowed to cool to ambient temperature and the polymer transferred to a bottle.

EXAMPLE 4

A hydrophobic polyelectrolyte copolymer was formed from 78% acrylamide (AcAm) and 22% dimethylaminoethylmethacrylate cetyl chloride quaternary (DMAEM.CCQ) monomers. The following reagents were mixed in a polymerization reaction vessel:

| | |
|---|---|
| 19.52 grams | 48.27% Solution of AcAm |
| 106.00 grams | 14% Solution of DMAEM.CCQ |
| 851.28 grams | Deionized Water |
| 2.00 grams | Adipic Acid |
| 0.20 grams | 2% Solution of Versene |
| 1.00 grams | 10% Solution of Vazo (50) |

The above reagents, except Vazo, were added to a polymerization reaction vessel in the order set forth above, purged with nitrogen and heated to 50° C. for five hours. Vazo (50) was added to the reaction vessel once its temperature reached 50° C.

EXAMPLE 5

A hydrophobic polyelectrolyte copolymer was formed from 90% acrylamide (AcAm) and 10% dimethylaminoethylmethacrylate cetyl chloride quaternary (DMAEM.CCQ) monomers. The following reagents were mixed in a polymerization reaction vessel:

| | |
|---|---|
| 31.40 grams | 48.27% Solution of AcAm |
| 65.70 grams | 14% Solution of DMAEM.CCQ |
| 879.70 grams | Deionized Water |
| 2.00 grams | Adipic Acid |
| 0.20 grams | 2% Solution of Versene |
| 1.00 grams | 10% Solution of Vazo (50) |

The above reagents, except Vazo, were added to a polymerization reaction vessel in the order set forth above, purged with nitrogen and heated to 50° C. for five hours. Vazo was added to the reaction vessel once the temperature reached 50° C.

EXAMPLE 6

A hydrophobic polyelectrolyte copolymer was formed from 90% acrylamide (AcAm) and 10% dimethylaminoethylmethacrylate cetyl bromide quaternary (DMAEM.CBQ) monomers. The following reagents were mixed in a polymerization reaction vessel:

| | |
|---|---|
| 18.80 grams | 48.27% Solution of AcAm |
| 13.50 grams | DMAEM.CCQ |
| 1000.0 grams | Deionized Water |
| 0.10 grams | Potassium Iodide (KI) |
| 1.80 grams | 2% Solution of Versene |
| 1.50 grams | 10% Solution of Vazo (50) |

DMAEM.CBQ, deionized water and KI were mixed together until the monomer was dissolved. Thereafter, AcAm and versene were added to the dissolved mixture. The reaction vessel was purged with nitrogen and the temperature was raised to 60° C. 1.00 grams of Vazo was diluted in deionized water and then added to the reaction vessel. After two hours of heating 0.50 grams of Vazo was added to the reaction vessel. Heating continued for another 3 hours for a total heating time of 5 hours. The product was a thin clear, light brown polymer. This product produced light flocs that readily settled at ~500 ppm.

EXAMPLE 7

A hydrophobic polyelectrolyte copolymer was formed from 78% acrylamide (AcAm) and 22% dimethylaminoethylmethacrylate cetyl bromide quaternary (DMAEM.CBQ) monomers. The following reagents were mixed in a polymerization reaction vessel:

| | |
|---|---|
| 37.60 grams | 48.27% Solution of AcAm |
| 27.00 grams | DMAEM.CBQ |
| 1000.0 grams | Deionized Water |
| 3.58 grams | 2% Solution of Versene |
| 4.60 grams | 10% Solution of Ammonium Persulfate |
| 5.00 grams | Adipic Acid |

DMAEM.CBQ and deionized water were mixed together until the monomer was dissolved. Thereafter, AcAm and versene were added to the dissolved mixture. The reaction vessel was purged with nitrogen and the temperature was raised to 50° C. 4.60 grams of APS was diluted in deionized water and then added to the reaction vessel. After two hours of heating the temperature was increased to 70° C. for an additional hour. The product was a thin, milky, polymer flocculation. Subsequent analysis indicated that the large dark flocs formed only after acidification of the polymer/lignin solution from a pH 11 to pH 3.

EXAMPLE 8

A hydrophobic polyelectrolyte copolymer was formed from 90% acrylamide (AcAm) and 10% dimethylaminoethylmethacrylate cetyl bromide quaternary (DMAEM.CBQ) monomers. The following reagents were mixed in a polymerization reaction vessel:

| | |
|---|---|
| 53.04 grams | 48.27% Solution of AcAm |
| 18.48 grams | DMAEM.CBQ |
| 927.92 grams | Deionized Water |
| 0.06 grams | 2% Solution of Versene |
| 0.50 grams | 10% Solution of Vazo (50) |
| 0.50 grams | Adipic Acid |

DMAEM.CBQ and deionized water were mixed together until the monomer was dissolved. Thereafter, AcAm and versene were added to the dissolved mixture and buffered with 0.50 grams of adipic acid. The reaction vessel was purged with nitrogen and the temperature was raised to 50° C. The Vazo was diluted in deionized water and then added to the reaction vessel. After three hours of heating the temperature was increased to 60° C. for an additional hour. The product was a thick, milky, polymer.

EXAMPLE 9

A hydrophobic polyelectrolyte copolymer was formed from 49.8% acrylamide (AcAm) and 50.2% dimethylaminoethylmethacrylate $C_{20}$ bromide quaternary (DMAEM.$C_{20}$BQ) monomers. The following reagents were mixed in a reaction vessel to prepare the DMAEM.$C_{20}$BQ from, DMAEM and bromo-eicosane:

| | |
|---|---|
| 25.00 grams | Bromo-eicosane |
| 11.00 grams | 99% Solution of DMAEM |
| 0.20 grams | Phenothiazine |
| 0.50 grams | Potassium Iodide (KI) |
| 400.00 ml | Tetrahydrofuran (THF) |
| 10.00 ml | Deionized Water |

Dissolved $CH_3C_{19}H_{38}Br$ (Bromo-eicosane) in tetrahydrofuran (300 ml). Added DMAEM which was diluted in 100 ml tetrahydrofuran and Phenothiazine. Dissolved potassium iodide in 10 ml of deionized water and added it to the reaction vessel. The reaction vessel was heated at 65° C. for 4 hours. The temperature was reduced to 25° C. and heated for an additional 18 hours. The reaction product is golden brown. The solvent was removed under vacuum.

Thereafter, a hydrophobic polyelectrolyte copolymer was formed from the above $DMAEM.C_{20}BQ$ monomer and AcAm. The following reagents were charged into a polymerization reaction vessel:

| | |
|---|---|
| 10.00 grams | 48.27% Solution of AcAm |
| 36.00 grams | $DMAEM.C_{20}BQ$ |
| 450.00 grams | Deionized Water |
| 2.00 grams | 2% Solution of Versene |
| 2.00 grams | 10% Solution of Ammonium Persulfate |
| 2.00 grams | Adipic Acid |

$DMAEM.C_{20}BQ$ and deionized water were mixed together until the monomer was dissolved. Thereafter, AcAm and versene were added to the dissolved mixture. The reaction vessel was purged with nitrogen and the temperature was raised to 65° C. 2.00 grams of APS was diluted in deionized water and added to the reaction vessel. After two hours the temperature was increased to 70° C. for an additional hour. The product was a milky, thin, polymer.

EXAMPLE 10

A hydrophobic polyelectrolyte copolymer was formed from 50% acrylamide (AcAm) and 50% dimethylaminoethylmethacrylate $C_8$ bromide quaternary $(DMAEM.C_8BQ)$ monomers. The following reagents were mixed in a polymerization reaction vessel:

| | |
|---|---|
| 4.20 grams | 48.27% Solution of AcAm |
| 10.00 grams | $DMAEM.C_8BQ$ |
| 245.60 grams | Deionized Water |
| 0.40 grams | 2% Solution of Versene |
| 0.40 grams | 10% Solution of Ammonium Persulfate |

AcAm was dissolved in deionized water and then versene was added thereto. This mixture was then stirred for 5 minutes at 25° C. $DMAEM.C_8BQ$ was dissolved in the remaining deionized water and then added to the dissolved AcAm mixture Thereafter, APS was added to the reaction vessel which was then heated to a temperature of about 60° C. After two hours the temperature was increased to 70° C. for one hour.

EXAMPLE 11

A hydrophobic monomer of dimethylaminoethylmethacrylate octyl bromide quaternary $(DMAEM.C_8BQ)$ was prepared by mixing the following reagents in a reaction vessel:

| | |
|---|---|
| 0.05 grams | Potassium Iodide (KI) |
| 20.18 grams | DMAEM |
| 25.11 grams | Octyl Bromide |
| 0.04 grams | Phenothiazine |
| 200.62 grams | Reagent Grade Tetrahydrofuran (THF) |

The mixture was stirred at 25° C. under a nitrogen atmosphere for 1.5 hours and then at 40° C. for 4 hours. The THF was removed under vacuum at 40° C.

EXAMPLE 12

A hydrophobic polyelectrolyte copolymer of 70% AcAm and 30% DMAEM.CBQ was tested for its ability to remove color from papermaking effluent. In preparation of this test 38.20 grams of copolymer was made up to 100 grams with deionized water in a 100 ml volume flask. Thereafter, 3 grams of lignin, 1,900 grams of deionized water and 100 grams of pH 10 buffer were added to the flask. The results are set forth below in Table 1:

TABLE 1

| POLYMER DOSAGE (PPM) | PT.CO.COLOR UNITS | % COLOR REMOVAL | COMMENTS |
|---|---|---|---|
| 100 | 2652 | 48 | Few Flocs |
| 200 | 1745 | 66 | Fine Flocs |
| 300 | 1142 | 77 | |
| 400 | 443 | — | |
| 500 | 181 | 96 | |

As demonstrated above, the hydrophobic polyelectrolyte copolymer of DMAEM.CBQ/AcAm exhibited increased color removal at dosages as high as 500 ppm without any "overdosage" effects.

EXAMPLE 13

A hydrophobic polyelectrolyte copolymer of 70% AcAm and 30% DMAEM.CBQ was tested for its ability to remove color from papermaking effluent. In preparation of this test 38.17 grams of copolymer was made up to 100 grams with deionized water in a 100 ml volume flask, i.e., 1% polymer or 2.62% active. Thereafter, 3 grams of lignin, 1,900 grams of deionized water and 100 grams of pH 10 buffer were added to the flask. This experiment was conducted using a 6 minute "slow" stir at 30 rpm. This was followed by a 10 minute settling time. The pH was adjusted to $\approx 7.4$ to 7.6 before measuring the color. The results are set forth below in TABLE 2:

TABLE 2

| POLYMER DOSAGE (PPM) | PT.CO.COLOR UNITS | % COLOR REMOVAL | COMMENTS |
|---|---|---|---|
| 0 | 1632 | — | Base Color |
| 100 | 1152 | 29 | No Floc |
| 200 | 1032 | 36 | No Floc |
| 300 | 606 | 62 | Fine Floc |
| 400 | 446 | 72 | Fine Floc |
| 500 | 318 | 80 | Very Fine Floc |
| 600 | 222 | 86 | Very Large Floc |
| 700 | 172 | 89 | Very Large Floc |
| 900 | 142 | 91 | Big Floc |
| 1000 | 178 | 89 | |

As demonstrated above, the hydrophobic polyelectrolyte of DMAEM.CBQ and AcAm exhibited substantial color removal properties even at concentrations as high as 1000 ppm without any "overdosage" effect.

EXAMPLE 14

A hydrophobic polyelectrolyte copolymer of 78% AcAm and 22% DMAEM.CBQ was tested for its ability to remove color from papermaking effluent. This was compared with a conventional color removal polymer of epichlorohydrin/dimethylamine (Epi/DMA). The results are set forth below in Table 3:

TABLE 3

| POLYMER DOSAGE (PPM) | PT.CO.COLOR UNITS | % COLOR REMOVAL | COMMENTS |
|---|---|---|---|
| AcAm/ DMAEM.CBQ | | | |
| 0 | 1632 | — | Base Color |
| 100 | 1152 | 30 | |
| 200 | 1032 | 38 | |
| 300 | 606 | 65 | |
| 400 | 446 | 75 | |
| 500 | 318 | 83 | |
| 600 | 222 | 89 | |
| 700 | 172 | 92 | |
| 900 | 142 | 96 | |
| 1000 | 178 | 94 | |
| EPI/DMA | | | |
| 100 | 1424 | 12 | |
| 200 | 596 | 63 | |
| 300 | 398 | 75 | |
| 400 | 314 | 80 | |
| 500 | 312 | 81 | |
| 600 | 374 | 77 | |
| 700 | 534 | 67 | |
| 900 | 804 | 50 | |

As demonstrated by the above comparative examples, the conventional system of Epi/DMA experienced "overdosage" at a concentration above 500 ppm and only reached a maximum color removal rate of 81%. To the contrary, the hydrophobic polyelectrolyte, i.e., DMAEM.CBQ/AcAm, did not exhibit any "overdosage" effects and reached a maximum color removal rate of 96% at 900 ppm.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A method for removing color bodies from a paper mill waste effluent which comprises the step of adding an effective amount of a hydrophobic polyelectrolyte copolymer to said effluent to flocculate said color bodies, said hydrophobic polyelectrolyte copolymer being formed from a mixture consisting of an acrylamide, a hydrophobic monomer selected from the group consisting of: dialkylaminoalkylacrylates having C8 to C20 quaternaries and dialkylaminoalkylmethacrylates having C8 to C20 quaternaries, water and a polymer initiator, and removing the flocculated color bodies from the effluent.

2. The method according to claim 1 wherein said quaternized dialkylaminoalkylacrylate is either dimethylaminoethylacrylate cetyl chloride quaternary or dimethylaminoethylacrylate cetyl bromide quaternary.

3. The method according to claim 1 wherein said quaternized dialkylaminoalkylacrylate is either dimethylaminoethylacrylate cetyl chloride quaternary or dimethylaminoethylacrylate cetyl bromide quaternary.

4. The method according to claim 1 wherein the hydrophobic monomer is the reaction product of either dialkylaminoalkylacrylate or dialkylaminoalkylmethacrylate and a long chain halide, said long chain halide is selected from the group consisting of: octylbromide, bromoeiconsane, decyl bromide, and cetyl bromide, thereby producing a quaternized amine.

5. The method according to claim 4 wherein said long chain halide is incorporated onto the backbone of either said dialkylaminoalkylacrylate or dialkylaminoalkylmethacrylate.

6. The method according to claim 1 wherein said acrylamide and said hydrophobic monomer are present in a molar ratio in the range from 99:1 to 1:99.

* * * * *